United States Patent [19]

Hoffman, Jr. et al.

[11] Patent Number: 5,390,237
[45] Date of Patent: Feb. 14, 1995

[54] WEATHER INFORMATION INTERFACE SYSTEM

[75] Inventors: Robert H. Hoffman, Jr., Nashville, Tenn.; Armand R. Marino, Marietta, Ga.; Iliff N. Hartman, North Richland Hills, Tex.

[73] Assignee: The Weather Radio Network, Inc., Nashville, Tenn.

[21] Appl. No.: 126,210

[22] Filed: Sep. 24, 1993

Related U.S. Application Data

[63] Continuation-in-part of Ser. No. 766,212, Sep. 27, 1991, abandoned.

[51] Int. Cl.⁶ .......................................... H04M 11/08
[52] U.S. Cl. ..................................... 379/67; 379/74; 379/84; 379/87; 379/101; 379/105; 379/201
[58] Field of Search ................ 379/67, 88, 96, 87, 379/84, 74, 100, 101, 105, 201

[56] References Cited

U.S. PATENT DOCUMENTS

| | | | |
|---|---|---|---|
| 4,521,857 | 6/1985 | Reynolds III | 379/76 |
| 4,899,369 | 2/1990 | Kondziela | 379/67 |
| 4,908,850 | 3/1990 | Masson et al. | 379/88 |
| 5,222,120 | 6/1993 | McLeod et al. | 379/216 |

*Primary Examiner*—James L. Dwyer
*Assistant Examiner*—Fan Tsang
*Attorney, Agent, or Firm*—Evenson, McKeown, Edwards & Lenahan

[57] ABSTRACT

A real time weather information access and distribution system having a central switching and interface unit accessed at least in part via a commercial telephone network. A remote weather station is selected by the incoming caller by means of a "decision tree" process using a touch tone phone, and the central switching and interface unit makes contact with a local interface unit at the selected geographically remote weather reporting station. Weather information being produced and broadcast locally by the weather reporting station is then provided to the geographically remote incoming caller on a real-time basis via the local interface unit, being in communication with said central switching and interface unit, and thence to individual callers desiring said real time weather information. The central interface unit includes means for allowing a plurality of incoming callers to be simultaneously provided with the same local weather information from the same desired locality, without said incoming callers being able to interact with other callers or affect operation of said central interface unit. At least one of the local interface units includes a bridge tap coupled to the NOAA weather radio console.

13 Claims, 3 Drawing Sheets

WEATHER INFORMATION INTERFACE SYSTEM

This is a continuation-in-part of application Ser. No. 07/766,212, filed Sep. 27, 1991, now abandoned.

The present invention relates to a real time weather information interface system. In particular, the invention provides a method and apparatus for providing long distance real time public access to continuously available and continuously updated detailed weather information from a plurality of sources situated at remote locations throughout a wide geographic area.

One source of such detailed local weather information, for example, is the National Weather Service (NWS), operated by the National Oceanic and Atmospheric Administration (NOAA), United States Department of Commerce. NWS operates approximately 380 weather observing stations which broadcast local weather data collected at locations scattered throughout the United States and its territories, known as NOAA Weather Radio. The present invention, of course, may be employed with any other source or sources of comparably detailed and continuously updated weather information such as may be provided on a regional basis by other cooperating weather observing and forecasting organizations.

NOAA Weather Radio currently broadcasts weather information from each of its 380 stations via VHF radio broadcasts, on frequencies between 162.400 and 162.550 MHz. Typically, such radio transmissions consist of locally generated recorded weather data segments which last between four and six minutes and then "loop" to provide a continuous broadcast. The broadcasts are continuously updated (that is, a new recorded segment is made) as new weather observations are taken at the station. Such broadcasts differ from those typically available, for example, from local telephone companies in major cities, which are updated perhaps only daily and which normally provide only superficial weather data, such as temperature readings (recorded at airport weather stations, for example) humidity, barometric pressure and an abbreviated weather forecast. Frequently, this information is distilled from the far more detailed, continuously updated information provided by NWS or by another weather service. A typical Coastal Station NOAA Weather Radio broadcast, for example, includes a marine weather synopsis which provides details of the sea-state, winds, visibility and tidal information that is simply not available from any now existing telephonic and/or human readable source on a nationwide system basis. Additionally, NOAA Weather Radio broadcasts contain special segments of interest to agricultural activities such as drying conditions and hours of daylight available for work, and in special circumstances, the progress and development of unusual weather phenomena such as hurricanes, waterspouts, tornadoes and the like.

Such comprehensive weather information is extremely useful to those persons whose activities, safety or enjoyment depend in some way on real time comprehensive knowledge of local weather conditions. For example, mariners—both commercial and operators of pleasure craft—have a compelling need for reliable weather information in order to help plan for their trips, and to make them safer and more enjoyable. Those with outdoor professions, such as professional photographers, whose ability to attain proper lighting and visibility conditions is essential to complete their assignments, also depend heavily on accurate foreknowledge of local weather conditions in remote locales. Similarly, vacation and business travelers often have need of such information in order to plan their schedules and itineraries prior to departure on trips to remote locales.

A problem encountered by those who seek the type of detailed local weather information which is available from such local sources is that it is normally only broadcast or distributed on a local basis. That is, despite the obvious utility of such information to persons in remote locations, no centralized audio voice system exists for making it available on a real time basis to geographically remote users. The NWS, for example, broadcasts its NOAA Weather Radio on local VHF radio, which is available only within a radius of about 50 miles, the effective range of such signals. Moreover, while such broadcasts are sometimes distributed as a public service via other media by local providers, these services typically serve about the same coverage areas as the VHF broadcast, so they are of no value to a person needing such information at a remote location.

While each local NWS station can be reached directly by telephone, in order to take advantage of this accessibility, it is necessary for a prospective user of such information to be aware of the location and telephone number of the NWS weather station nearest his or her area of interest, which is frequently unknown and difficult to obtain. A caller wishing to contact the Nashville, Tenn. NWS facility, for example, would not be able to find the telephone number from Nashville information listings, as the facility is located in the small adjacent community of Mt. Julliet, Tenn., and is thus not listed as a Nashville number. The same situation exists for other NWS facilities. Moreover, even if the number is known, the NWS personnel are not required to give out personalized briefings to the general public, and sometimes will not if they are too busy to do so. Thus, due to the lack of a centralized real time audio voice distribution system, it is expensive, difficult or impossible to get completely detailed and timely weather information on a distant location.

Existing systems do now provide nationwide access to some local weather information via a centralized location by means of "boiler plate" format recordings made at and distributed from a central location based on severely edited information obtained from local weather stations at remote locations usually via a non voice teletype service known as "Weather Wire" provided by the NWS. Such systems, can now be accessed by commercial telephone network. They do not, however, provide any mechanism for connecting the caller directly to a local weather station at the remote location and do not provide weather information from such stations on a real time basis. Because the information is edited, abbreviated, recorded and made available only from the centralized location, it is necessarily delayed in the process and omits much of the current detailed weather information which is available from the local weather stations because it must be made to fit a standard "boiler plate" format. Moreover, because the central recordings are updated only periodically and not continuously (as is the real time local broadcast) the information may be stale by the time it is received, particularly in fast changing conditions such as frequently occur in storm systems, fronts, and the like.

It is therefore an object of the present invention to provide a method and apparatus for a single source of access on a "live" or real time basis to weather information or data recorded and locally broadcast at geographically remote weather stations.

It is a further object of the invention to make such real time weather information available via a commercial telephone network.

These and other objects and advantages are achieved by the real time weather information interface according to the invention, in which a central switching and interface unit is accessed via public commercial telephone network. A remote weather station is selected by the incoming caller by means of a "decision tree" selection process using a touch tone telephone, and the central switching and interface unit makes contact with a local interface unit at the caller selected remote weather reporting station. Weather information broadcast locally by the remote weather reporting station is then provided to the incoming caller on a real time basis via the local interface unit being connected to an outgoing telephone line, then to the central switching unit and on to the caller.

Other objects, advantages and novel features of the present invention will become apparent from the following detailed description of the invention when considered in conjunction with the accompanying drawings.

DETAILED DESCRIPTION OF THE DRAWINGS

Figure 1:
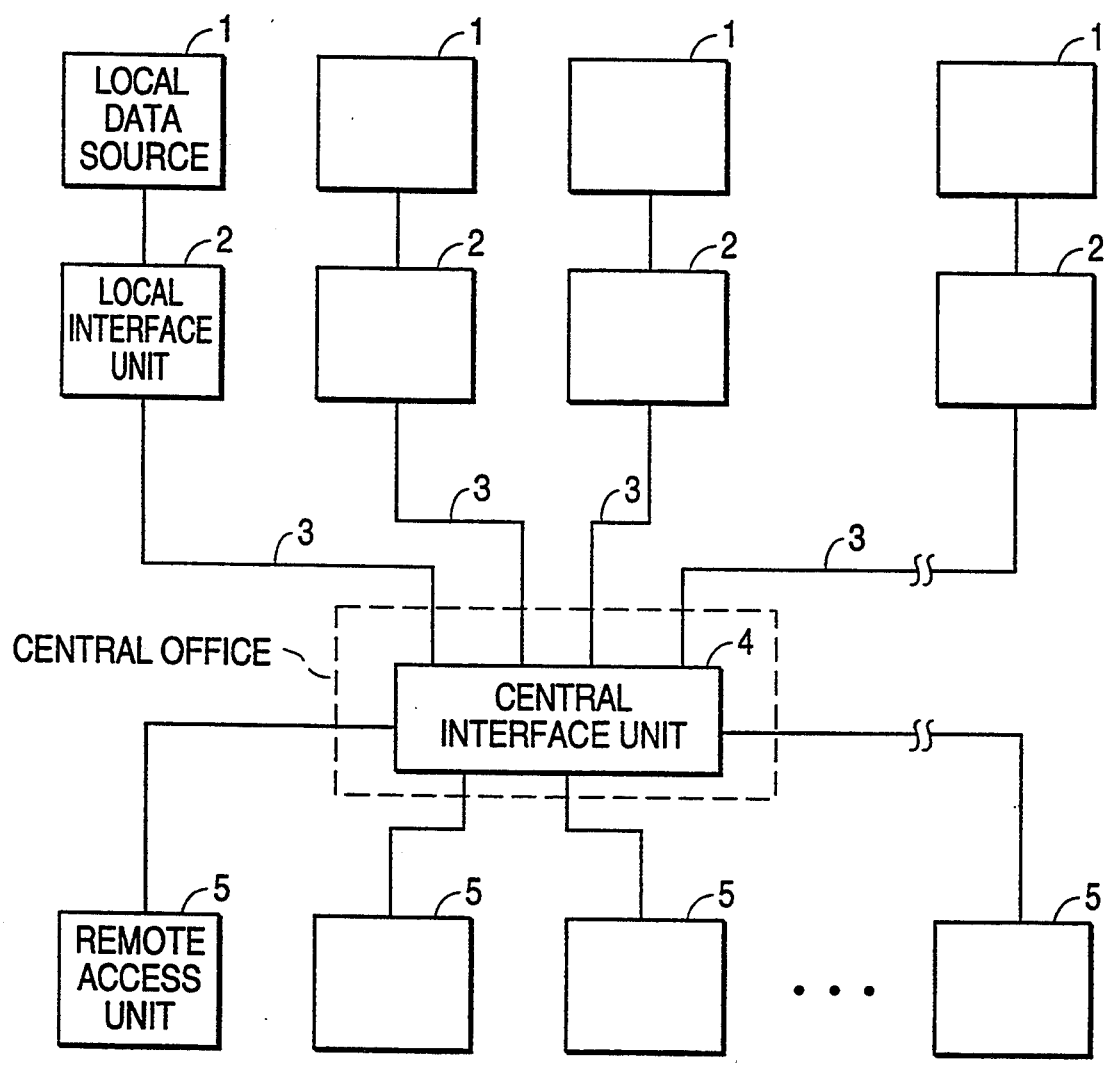
FIG. 1 is a schematic depiction of the information interface system according to the invention.

Referring to FIG. 1, there is shown a plurality of sources of locally distributed weather information 1, which may be, for example, local weather stations operated by NWS and broadcasting local weather information via VHF radio, or any other source of continuously updated local weather data. These local weather information sources may be distributed across a wide geographic area, but at sites at which communications facilities are available. At the site of each of the sources of locally distributed weather information, a local interface unit 2 is coupled to access the local weather information and to input it to a plurality of media 3 for communicating it to a central interface unit 4. In a preferred embodiment, the interface unit 2 includes an impedance matching circuit referred to as a bridge tap 6 (FIG. 2), by which it is coupled to a NOAA Weather Radio console, for example, a model B420 or B422 NWR audio console. A bridge tap suitable for this purpose is available, for example, from Granite Telephone Co. of Manchester, N.H. In another preferred embodiment, the interface unit 2 includes a dedicated VHF weather radio receiver situated within the local transmitter service range of a selected remote weather broadcasting facility. The communications media 3 may be commercial telephone lines, including either dedicated open long distance lines or timed access commercial telephone lines having an unlisted telephone number, or may be any other medium of long distance communications such as radio transmitters, or satellite communication links.

Each of the communications lines 3 is coupled, either continuously (as in the case of a dedicated open long distance telephone line) or on an as needed basis (as in the case of timed access long distance telephone lines) to a central interface unit 4. Where timed access long distance telephone lines are used, local interface unit 2 also includes a conventional commercial telephone answering unit, such as is available from Granite Telephone Co. Where dedicated long distance lines are used, they are coupled directly to the bridge tap or VHF receiver of local interface unit 2.

Figure 2:
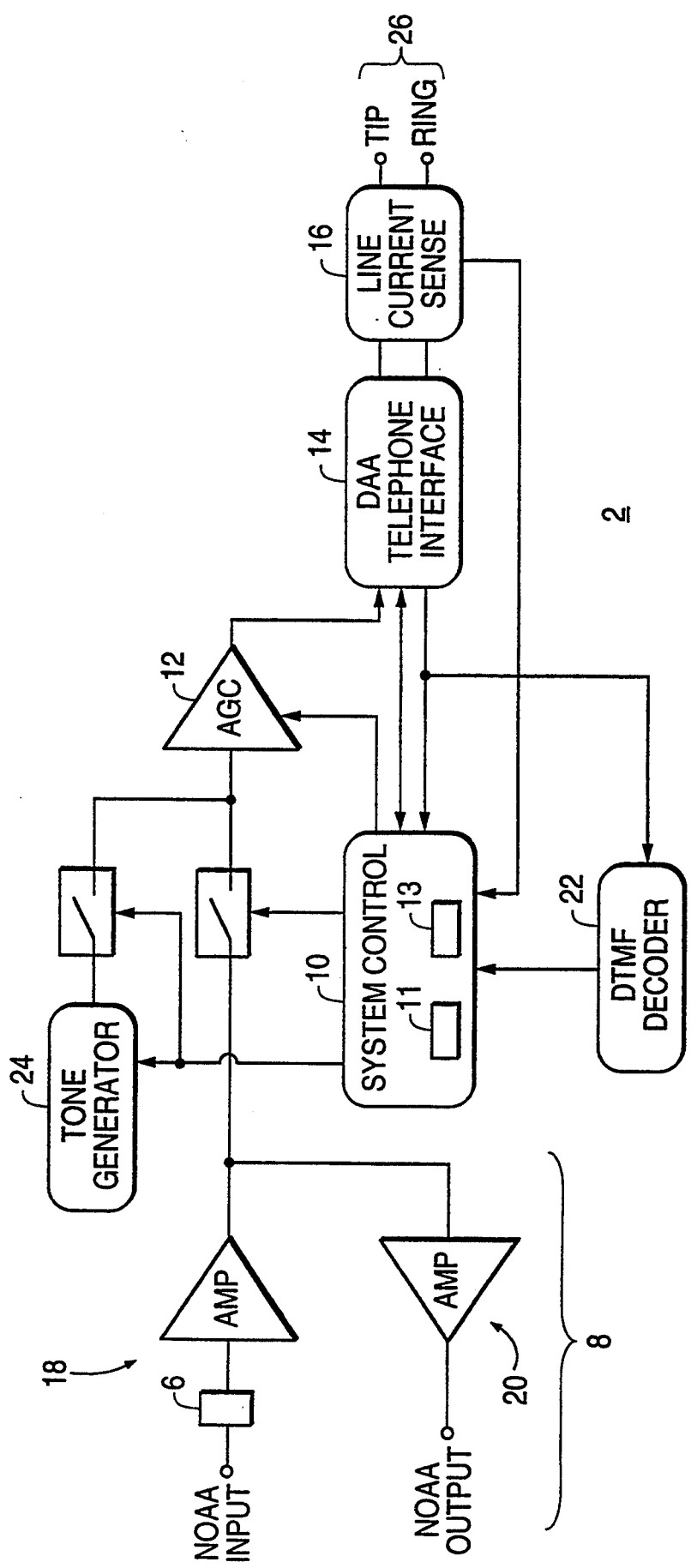
FIG. 2 is a system block diagram of a local interface unit according to the invention.

FIG. 2 is a system block diagram of a preferred embodiment for the local interface unit 2, in which the local interface unit 2 couples audio signals from the NOAA Weather Radio onto the tip/ring conductors of a telephone line, such as communication lines 3 (FIG. 1). In FIG. 2, section 8 couples the local interface unit 2 with the locally distributed weather information source such as the NOAA Weather Radio broadcast via audio input section 18 and audio output section 20. A system control 10, for example, a conventional and appropriately programmed microprocessor, controls the operation of the local interface unit 2. The system control 10 includes a configuration memory 11 and program memory 13. The configuration memory 11 can be, for example, non-volatile memory space which holds data that describes the configuration features of the local interface unit 2. Such features are, for example, access and maintenance passwords, gain settings, various timeout function settings, etc. The program memory 13 can be, for example, a reprogrammable memory for storing the operating instructions for the microprocessor 10. The program memory 13 must be of sufficient size to store all defined functions for the local interface unit 2, for example, 8000 bytes.

The system control 10 couples with a tone generator circuit 24, an automatic gain control circuit (AGC) 12, a telephone interface circuit 14, a line current sense circuit 16 and a dual tone multi-frequency (DTMF) decoder circuit 22, for controlling the functionality of these circuits within the local interface unit 2. The audio input from the NOAA Weather Radio broadcast is provided to the automatic gain control circuit 12. The automatic gain control circuit 12 monitors the audio signal strength delivered to the local interface unit 2 and maintains it at a maximum acceptable level as defined by telephone industry regulations. From the automatic gain control circuit 12, the audio input is coupled with a telephone interface circuit 14. The telephone interface circuit 14 can be, for example, a standard auto-answer, dial up telephone link meeting FCC regulations as stated in Part 68. The telephone interface circuit 14 will implement isolation and input protection in order to protect the local interface unit 2.

The telephone interface circuit 14 provides a tip/ring output of the weather broadcast to a line current sense circuit 16. The line current sense circuit 16 senses the line current when the local interface unit 2 has gone off-hook thus indicating an active telephone circuit or connection. The tip/ring conductors from the telephone interface circuit 14 are indicated at 26 and are thus coupled to the central interface unit 4 (FIG. 1). As noted above, the tip/ting conductors 26 can form the communication lines 3 shown in FIG. 1.

A DTMF decoder 22 is provided for receiving and decoding DTMF signals received via the telephone interface circuit 14. The outputs from the DTMF decoder 22 are provided to the system control 10 for properly controlling the local interface unit 2.

The tone generator circuit 24 generates tones, for example, a 400 Hz sign wave signal tone having an accuracy tolerance of ±5 Hz and an output level setting of 0 dbm maximum. The sign wave signal is provided to the automatic gain control circuit 12 for output onto the communication lines 3. The tone generator circuit 24 is controlled via signals received from the system control 10.

In a preferred embodiment, the audio input section 18 is a bridging audio interface for inputting NOAA Weather Radio audio output into the local interface unit 2. The audio interface circuit 18 can, for example, have an input impedance of greater than 10,000 ohms at frequencies between 100 and 4,000 Hz. Also provided is an audio output circuit 20 which outputs from the local interface unit 2 to the audio from the audio input circuit 18. For example, the audio output circuit 20 can provide sufficient gain to cancel any interfering losses. The audio output circuit should, for example, be able to drive a 600 ohm load to a minimum of 0 dbm.

The local interface unit 2 shown in FIG. 2 functions in the following sequence. The local interface unit 2 monitors the communication line 3, i.e., the tip/ring pair 26, for a ringing signal and answers the telephone call when the ringing signal is received. After answering the call, the local interface unit 2 transmits a connect tone provide by the tone generator circuit 24 to the calling party. Next, the local interface unit 2 receives and validates a DTMF coded password received over the communication line 3. Once validated, for example, by transmitting a valid password received tone, the local interface unit 2 connects the calling party with the audio from the NOAA Weather Radio console, i.e., the local data source 1 in FIG. 1. Further, the local interface unit 2 monitors the communication line to determine if the call is terminated. If so, the local interface unit acts accordingly to terminate the call.

In a preferred mode of operation, the local interface unit 2 functions to take itself off-hook after receiving two ringing signals on the tip/ring conductors 26, i.e. the communication line 3 of FIG. 1. After going off-hook, the local interface unit 2 pauses for a second and then transmits a precision dial tone to the calling party. The precision dial tone provides several signals to the calling party. First, it is an indication for the calling party to begin sending DTMF passwords. Secondly, it provides an indication to the calling party that the expected audio program source is available. Other functions may also be implemented such as indicating that it is receiving new password digits; indicating that it received a valid password; and indicating that it received an incorrect new password sequence.

After the local interface unit 2 answers the incoming call and starts the precision dial tone transmission, the local interface unit 2 waits a predetermined time, for example, three seconds, to receive an access password. If the local interface unit fails to receive the access password within the prescribed time, it immediately goes on-hook and begins to again monitor the communication line for another ringing signal. However, once the local interface unit begins receiving DTMF signals from the calling party, it discontinues generating the precision dial tone.

In a preferred embodiment, the access password can be DTMF coded and transmitted. The password may contain, for example, seven characters or digits in which the first character of the password is always the "*" digit followed by numerical digits, i.e., 0–9. Each DTMF digit in the password should, for example, be active for a minimum time period with a further minimum time period between digits.

As noted above, once the access password has been validated by the local interface unit 2, the local interface unit 2 connects the audio signal from the NOAA Weather Radio broadcast to the telephone circuit for transmission to the calling party. While in this configuration, the local interface unit both monitors the telephone circuit line current via the line current sense circuit 16 for a drop-out which indicates termination of the call and it monitors the audio from the NOAA Weather Radio broadcast interface for a minimum signal level.

If the local interface unit detects, for example, a line current drop-out, i.e., no current on the line, for more than 180 msec, the local interface unit 2 terminates the call and again goes on-hook. Similarly, if the local interface unit 2 receives a call termination signal, i.e., a DTMF digit "A" signal followed immediately by a DTMF digit "B" signal from the calling party, the local interface unit will reply with a dial tone for one second indicating reception of the call termination signal and then goes on-hook.

Along with the function of coupling the weather radio broadcast to the telephone circuit, the local interface units also is provided with a maintenance access function. The maintenance access function allows the local interface unit 2 to be checked for function performance and/or reconfiguration via the telephone interface circuit 14. To gain access to the maintenance functions after calling the local interface unit 2, a maintenance access password must be received.

Once the local interface unit 2 validates a received maintenance access password, the local interface unit 2 can receive and execute single digit DTMF commands from the telephone interface circuit 14 for performing a number of maintenance functions, for example, audio monitoring, password change, call termination, set timeout time, set password level, etc.

Referring back to FIG. 1, the central interface unit, in turn can be accessed from a plurality of access points 5, for example, by commercial long distance telephone. For this purpose, the central interface unit is assigned a telephone number which may be a 1-800 or a 1-900 number. Alternatively, and within the scope of the invention, the central interface unit may also be accessed by any other medium in a known manner, as for example, by radio or satellite link. Central interface unit 4, may be, for example, an interactive telephone switching unit which is capable of answering an incoming telephone call and connecting it to a selected remote weather data source, such as a NOAA Weather Radio console, in response to a series of codes entered by a caller by, for example, pushing buttons on a touch tone telephone unit. In those instances in which the incoming caller selects a remote data source served by a dedicated open long distance telephone line, the incoming call is simply connected to the open line. To access those locations served by timed access commercial telephone service, central interface unit 4 also has a high speed dialer which is activated to access the selected location in response to entry of the corresponding code.

Central interface unit 4 may be a known commercially available telephone answering and switching device. Such units can be DOS based microcomputers, for example, a 486 Texas Microsystems unit configured to perform telecommunications using existing Dialogic Corp. and Dianatel, Inc. components. Similarly, local interface units 2 may be commercial telephone answering devices available from Granite Telephone Co. of Manchester, N.H., Data Signal, Inc. of Albany, Ga., and others, which have the capability to answer incoming calls and, in response to a numerical tone code sequence, connect the incoming caller to the outgoing weather radio audio program material.

In operation of the weather information interface apparatus according to the invention, a caller accesses the central interface unit 4, for example, by dialing a 1-800 or 1-900 long distance telephone number, and the central interface unit answers the call and transmits a recorded message which instructs the caller to enter the three digit telephone area code for the location desired; for example "615" for Tennessee, "212" for New York City, etc. The caller then hears a listing of weather stations available in that state or area code, with a number (usually one digit) for each. Upon pressing the number corresponding to the desired location, the caller is then connected directly to the on-going local weather information broadcast from the weather station at the selected location, on a real time basis. That is, the caller receives the information directly and immediately as it is locally broadcast by the remote facility. Ordinarily, such information would be in the form of spoken words which are heard directly by the caller, but could be in other, for example, machine readable form such as a digital code which would then be converted to human audio format by the central interface unit 4. If a caller uses the service repeatedly for the same station, he can skip the "decision tree" process and immediately enter the code to get the selected broadcast, thus saving time and money.

The operation of the central interface unit 2 for connecting the caller with the ongoing local weather information broadcast can, in a preferred embodiment, be carried out via the communication line 3 which couples with the local interface unit 2 as described in FIG. 2.

In practice, available NOAA Weather Radio broadcasts "loop" every four to six minutes, and the caller can decide when he has heard the portion pertinent to his special need or interest and then simply disconnect. In a preferred embodiment, central interface unit 4 includes an automatic disconnect after a maximum of 1.5 "loops" or approximately 12 minutes total connection time, to prevent, for example, a small child dialing the number and just listening continuously. This procedure would also guarantee more equal access to the finite number of incoming telephone access circuits the system is using at any point in time. After a user of the system became familiar with it, he could reduce his "per briefing" time charges by immediately entering the correct touch-tone sequence upon his call being connected so that he could bypass the system's information system that will be necessary to assist first time or occasional users through the "decision tree" process.

When a caller accesses a station which is served by a single long distance telephone circuit connecting it to interface unit 4, two situations could occur: (1) the station is already on-line servicing a previous request, so the new request is simply connected to the already open line. The central interface unit 4 will not disconnect (hang up) if it is in process with one or more incoming calls for that station, but will disconnect when no callers need that station. (2) When a caller accesses this station, and the line is not in use at that moment, the central interface unit 4 simply speed dials the unlisted local telephone number to reconnect it via interface unit 2.

To prevent accidental or unauthorized access to the unlisted number telephone line connected to interface unit 2 by anything other than central interface unit 4 (for example telemarketing callers or computers) in a preferred embodiment of the invention, local interface unit 2 requires the entry of a multiple digit secret numerical code, which is speed dialed by the central interface unit 4 following the telephone number in response to receiving a 400 Hz precision tone transmitted by the local interface unit 2, in order to complete the connection when interface unit 2 answers an incoming call. If such a code is not received within three seconds after the incoming call is answered with the precision tone, local interface unit 2 simply hangs up and breaks the connection with the attempted incoming call. Thus, the local interface unit is accessible only via the central interface unit 4. A local interface unit suitable for this purpose is available from Granite Telephone Co. of Manchester, N.H. and Data Signal, Inc. of Albany, Ga. Alternatively, the local interface unit described with respect to FIG. 2 provides a most preferred embodiment for carrying out this purpose.

Whenever two or more callers access the same local interface unit 2 simultaneously, central interface unit 4 prevents the respective incoming callers from communicating with each other, or "conferencing", while simultaneously enabling them to "listen only" to the shared NOAA Weather Radio program material incoming on a single line. Apparatus for this purpose is known, and is available, for example, from Dialogic, Corp. and others.

Figure 3A:
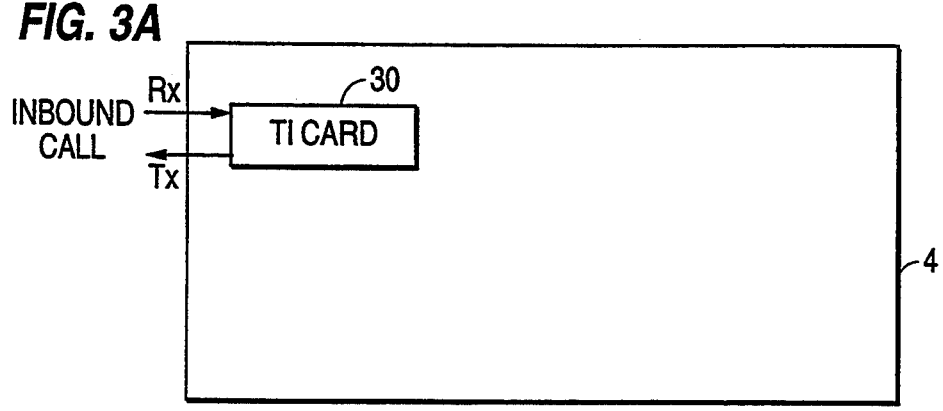
FIGS. 3A-3D illustrate the call progress at the central interface unit according to the invention.
Figure 3B:
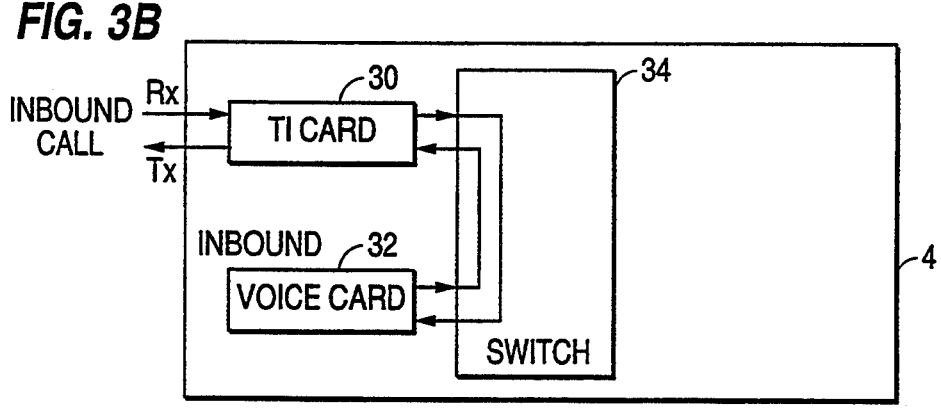

FIGS. 3a–d illustrate the call progress through the central interface unit 4 in a preferred embodiment. As discussed above, the central interface unit 4 couples with the remote access units 5 via, for example, a standard commercial long distance telephone T1 circuit interface. The use of a T1 interface provides voice to and from the central interface unit 4 in a digital format. The voice coming to the central interface unit is received on one data stream RX and the voice leaving the central interface unit is transmitted on another dam stream TX. There are a total of 24 separate inbound and outbound voice paths on a T1 interface. With respect to FIGS. 3a–d, the operation of the central interface unit 4 for a typical call is illustrated. In FIG. 3a, an inbound call, for example, from a caller at a remote access unit 5 (FIG. 1), is received by a T1 circuit card 30 of the central interface unit 4 on the inbound T1 line RX. The inbound call is then cross-connected to a voice circuit board 32 via a digital switch matrix 34 in the central interface unit 4 as shown in FIG. 3b. The voice circuit board 32 processes the call by providing voice outputs back to the caller on the outbound TX line. Further, the voice circuit board 32 accepts DTMF signal commands provided by the calling party.

Figure 3C:
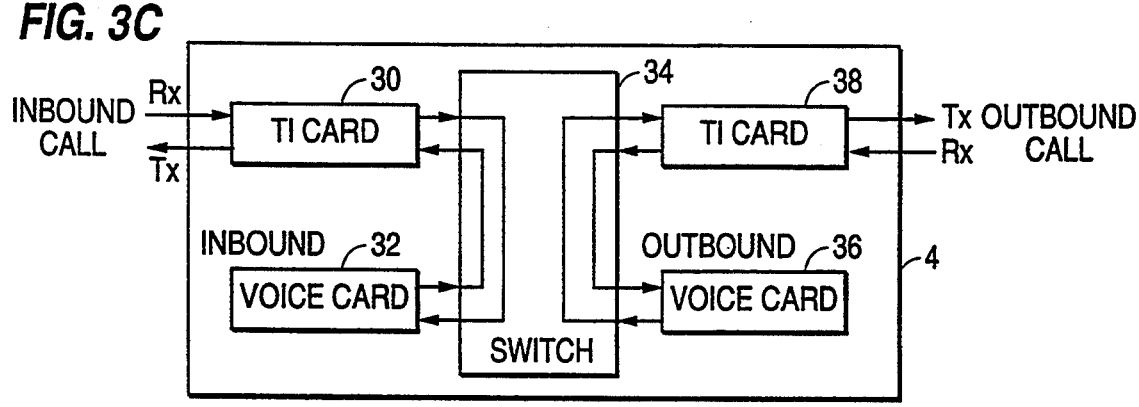

As shown in FIG. 3c, when the calling party requests a particularly NOAA Weather Radio broadcast, another voice circuit board 36 attaches the outbound T1 line from the central interface unit 4 and dials the desired local interface unit 2 to access the requested NOAA Weather Radio station over the long distance network. Again, the switch 34 operates to cross-connect the voice circuit board 36 with the T1 circuit card 38 for placing the outbound call.

Figure 3D:
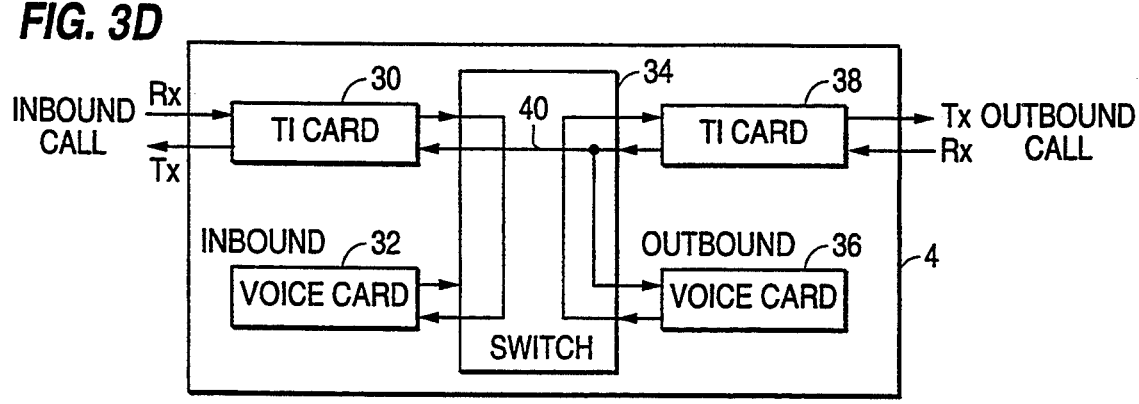

With respect to FIG. 3d, once the proper handshaking protocol is completed between the voice circuit board 36 and the local interface unit 2, the inbound data stream RX from the outbound call is rerouted as indicated on line 40 through digital switch matrix 34 to go out on the output data stream TX of the inbound call. Thus, the caller from the remote access unit 5 is then coupled to receive the weather broadcast from the NOAA weather broadcast station.

In this configuration, the inbound T1 voice circuit board 32 is still allowed to receive commands from the caller. However, the caller can only hear the RX data from the outbound T1 circuit card 38. Further, the RX data from the outbound T1 circuit card 38 is transmitted both to the TX of the inbound call and the RX of the outbound voice circuit board 36. By doing this, the outbound voice circuit board 36 can listen for an on-hook or hang up condition to perform a proper call tear-down.

It is an advantage of the present invention that the use of T1 data streams, which are simply data bits, allows the data streams to be copied to as many places as they are needed in any given time. Even though a data stream can be transmitted to many places at once, a particular data stream can receive from only a single place at one time. In order to receive from more than a single place, digital signal processing hardware is necessary to perform a summation of two or more data streams.

If another caller desires access to the same NOAA Weather Radio station, then when the call is received by a T1 circuit card of the central interface unit 2, the inbound portion of that call proceeds exactly as the first call as noted with respect to FIGS. 3a-d. The central interface unit 4 recognizes that the same NOAA Weather Radio station has been requested through commands to the voice circuit board and also recognizes that an outbound call has already been established with that particular NOAA Weather Radio station. Therefore, the central interface unit 2 simply couples another copy of the outbound RX dam from the NOAA Weather Radio station to the new caller. In this manner, interaction between the RX and TX data streams of the two inbound calls is prevented.

The processing of the inbound calls, as illustrated for example in FIGS. 3a-d, is performed under the control of the system software in the central interface unit 4. The central interface unit functions can be carried out via, for example, a microcomputer or microprocessor, that is programmed accordingly. A preferred embodiment of the program code for executing the central interface unit functions is provided in Appendix A.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A system for providing real time wide area access to continuously updated local weather information from a plurality of remote sources of continuously available updated local weather information at a plurality of geographically dispersed localities, comprising:

a plurality of local interface units, each said local interface unit being coupled to one of the remote sources, the local interface units receiving said local weather information from said remote sources and transferring the local weather information;

a central interface unit coupled to each of the local interface units and accessible by an incoming caller via telephone service, the central interface unit selectively coupling the incoming caller to one of said local interface units in response to selection of a desired locality by the incoming caller to provide the incoming caller with the local weather information in human recognizable audio form from the local interface unit of the desired locality on a real-time basis; and wherein the central interface unit includes means for allowing a plurality of incoming callers to be simultaneously provided with the same local weather information from the same desired locality, without said incoming callers being able to interact with other callers.

2. The system of claim 1, wherein at least one of the remote sources is an National Oceanic and Atmospheric Administration weather radio console.

3. The system of claim 2, wherein at least one of the local interface units includes a bridge tap coupled to the National Oceanic and Atmospheric Administration weather radio console.

4. The system of claim 1, further comprising telephone lines connected between the local interface units and the central interface unit.

5. A system for providing real time wide area access to continuously updated local weather information from a plurality of remote sources of continuously available updated local weather information at a plurality of geographically dispersed localities, comprising:

a plurality of local interface units, each said local interface unit being coupled to one of the remote sources, the local interface units receiving said local weather information from said remote sources and transferring the local weather information;

a central interface unit coupled to each of the local interface units and accessible by an incoming caller via telephone service, the central interface unit selectively coupling the incoming caller to one of said local interface units in response to selection of a desired locality by the incoming caller to provide the incoming caller with the local weather information in human recognizable audio form from the local interface unit of the desired locality on a real-time basis;

wherein the local interface unit comprises:

an input section receiving said local weather information as an audio signal;

a gain control circuit coupled to said input section for monitoring and maintaining audio signal strength of said audio signal of the local weather information; and an interface circuit coupled to said gain control circuit for interfacing said audio signal with a communication line from the central interface unit.

6. A system according to claim 5, wherein said communication line is a telephone line having tip and ring conductors and wherein said local interface unit further comprises:

a line current sense circuit coupled to said tip/ring conductors of the telephone line for sensing line current on the telephone line;

a system controller coupling with said interface circuit and said line current sense circuit to determine an active telephone call from said central interface unit;

a DTMF decoder receiving inputs from said interface circuit and providing decoded outputs to said system controller; and a tone generator controlled via said system controller and providing tone outputs to said gain control circuit.

7. A system according to claim 6, wherein said system controller is a microprocessor having a configuration and program memories.

8. A system according to claim 7, wherein said input section of said local interface unit includes audio input and output circuits coupled with the remote source.

9. A system for providing real time wide area access to continuously updated local weather information from a plurality of remote sources of continuously available updated local weather information at a plurality of geographically dispersed localities, comprising:

a plurality of local interface units, each said local interface unit being coupled to one of the remote sources, the local interface units receiving said local weather information from said remote sources and transferring the local weather information;

a central interface unit coupled to each of the local interface units and accessible by an incoming caller via telephone service, the central interface unit selectively coupling the incoming caller to one of said local interface units in response to selection of a desired locality by the incoming caller to provide the incoming caller with the local weather information in human recognizable audio form from the local interface unit of the desired locality on a real-time basis;

wherein the central interface unit comprises:

a plurality of T1 circuit cards that are recessed by the incoming caller via a T1 interface;

a plurality of voice circuit boards for processing the incoming caller; and a digital switch matrix coupled to each of said boards to provide cross-connecting between said T1 circuit cards and voice circuit boards.

10. A system according to claim 9, wherein the local interface unit comprises:

an input section receiving said local weather information as an audio signal;

a gain control circuit coupled to said input section for monitoring and maintaining audio signal strength of said audio signal of the local weather information; and an interface circuit coupled to said gain control circuit for interfacing said audio signal with a communication line from the central interface unit.

11. A system according to claim 10, wherein said communication line is a telephone line having tip and ring conductors and wherein said local interface unit further comprises:

a line current sense circuit coupled to said tip/ring conductors of the telephone line for sensing line current on the telephone line;

a system controller coupling with said interface circuit and said line current sense circuit to determine an active telephone call from said central interface unit;

a DTMF decoder receiving inputs from said interface circuit and providing decoded outputs to said system controller; and a tone generator controlled via said system controller and providing tone outputs to said gain control circuit.

12. A system according to claim 11, wherein said system controller is a microprocessor having a configuration and program memories.

13. A system according to claim 12, wherein said input section of said local interface unit includes audio input and output circuits coupled with the remote source.

* * * * *